United States Patent
Hentschel et al.

(10) Patent No.: US 6,418,858 B1
(45) Date of Patent: Jul. 16, 2002

(54) METHOD FOR DRIVE COORDINATION OF RAIL-GUIDED VEHICLES WITH INDIVIDUAL-WHEEL DRIVE

(75) Inventors: Frank Hentschel, Berlin; Markus Koch, Schwabach; Norbert Ott, Hanau; Rolf Krouzilek, Berlin, all of (DE)

(73) Assignee: DaimlerChrysler AG (DE)

( * ) Notice: Subject to any disclaimer, the term of this patent is extended or adjusted under 35 U.S.C. 154(b) by 0 days.

(21) Appl. No.: 09/485,577

(22) PCT Filed: May 28, 1999

(86) PCT No.: PCT/EP99/03699

§ 371 (c)(1),
(2), (4) Date: May 9, 2000

(87) PCT Pub. No.: WO99/65752

PCT Pub. Date: Dec. 23, 1999

(30) Foreign Application Priority Data

Jun. 13, 1998 (DE) .......................... 198 26 452

(51) Int. Cl.⁷ .............................. B61C 3/00; G05D 1/02
(52) U.S. Cl. .......................... 105/61; 105/49; 318/580; 318/587
(58) Field of Search ................................ 318/580, 583, 318/586, 587; 701/19; 105/49, 61

(56) References Cited

U.S. PATENT DOCUMENTS

| | | | | |
|---|---|---|---|---|
| 2,788,518 A | * | 4/1957 | Burns | 105/61 |
| 3,898,937 A | * | 8/1975 | Johnson | 105/61 |
| 3,937,152 A | * | 2/1976 | Nilsson et al. | 105/61 |
| 4,041,283 A | * | 8/1977 | Mosier | 105/61 |
| 4,042,810 A | * | 8/1977 | Mosher | 105/61 |
| 4,118,774 A | * | 10/1978 | Franke | 105/61 |
| 4,136,303 A | * | 1/1979 | Almquist et al. | 318/52 |
| 4,264,851 A | * | 4/1981 | Paramythioti et al. | 318/587 |
| 4,976,332 A | * | 12/1990 | Hein | 180/197 |
| 5,392,716 A | * | 2/1995 | Orschek et al. | 105/61 |
| 5,416,707 A | | 5/1995 | Reng | |
| 5,740,547 A | * | 4/1998 | Kull et al. | 701/19 |
| 6,025,687 A | * | 2/2000 | Himeda et al. | 318/586 |
| 6,161,064 A | * | 12/2000 | Strasser et al. | 701/19 |
| 6,163,116 A | * | 12/2000 | Tanquary et al. | 318/66 |

FOREIGN PATENT DOCUMENTS

| | | |
|---|---|---|
| DE | 3635804 | 5/1988 |
| DE | 4037626 | 6/1992 |
| DE | 4114860 | 6/1992 |
| EP | 0557892 | 9/1993 |

* cited by examiner

Primary Examiner—Stephen T. Gordon
Assistant Examiner—Greg Blankenship
(74) Attorney, Agent, or Firm—Webb Ziesenheim Logsdon Orkin & Hanson, P.C.

(57) ABSTRACT

A method for the drive coordination of a rail-guided vehicle with individual-wheel drive traveling on straight track, including the steps of determining a differential speed ($\Delta n$) of opposite track wheels and a control value ($\Delta M$) by a controller as a function of a set point, whereby the set point is ideally zero and the frequency and the damping of the control value ($\Delta M$) can be dynamically adjusted by controller parameters. The invention further comprises a method for the drive coordination of a rail-guided vehicle with individual-wheel drive, in particular when the vehicle is traveling over curves, in which at least one axle is fastened so that it can rotate with respect to the underbody, whereby the angular position ($\gamma_{st}$) of the axle with respect to the underbody is regulated so that the track wheels are tangential to the rail by setting the angular position ($\gamma_{st}$) of the axle by means of the torque set points ($M_{Set,l}$, $M_{Set,r}$) of the individual wheel drives. This invention further comprises a combination of the two methods described above, whereby the axle is fixed by arresting means as a function of the radius of the curve.

24 Claims, 3 Drawing Sheets

METHOD FOR DRIVE COORDINATION OF RAIL-GUIDED VEHICLES WITH INDIVIDUAL-WHEEL DRIVE

BACKGROUND OF THE INVENTION

1. Field of the Invention

This invention relates to methods and devices to coordinate drive systems of rail-guided vehicles with individual-wheel drive.

2. Description of the Prior Art

Since the early 1990s, many manufacturers of streetcars have been offering vehicles with a continuous low floor (100% low-floor vehicles). The difficulty in the development of these low-floor railway vehicles was that the wheel set axle used in the earliest models extended through the passenger compartment and was therefore not compatible with the low-floor concept. One solution that most of the manufacturers adopted was to replace the wheel set axle with individual-wheel suspension and an individual-wheel drive system.

Wheel set axles, the track wheels of which have a conical wheel profile, have the natural tendency, when there is a lateral offset or mismatch of the wheel set, to automatically turn away from the center of the track, i.e. to execute a pivoting or turning movement around the vertical axis. They are therefore able both to prevent continuous unilateral striking of the flange against the rail head by a wheel in a straight track without external support, and also, for the radial adjustment of the wheel set axle to the center point of the track curve, to execute the necessary turning movements themselves without external steering assistance. This natural advantage of the track guidance principle of the wheel set is simultaneously its greatest disadvantage.

The ability of the wheel set to turn independently means that a wheel set that was once caused to execute a turning movement in a straight track, continues to execute uncontrolled and continuously alternating turning movements. It thereby moves on a wave-shaped path (sine curve) through the track channel of the track. Undesirable skewing and a constant alternation of drive and braking forces at the wheel-rail contact points of the track wheels are the cause of a rough ride of the vehicle. Wear on the track wheels and the rails as well as loud running noises are the logical consequences. The movements of the wheel set can thereby become so great that they result in derailments.

Unconnected wheel pairs, on the other hand, are not capable of self-steering, as a result of which they are unsuitable for travel around curves.

DE 195 40 089 A1 describes a method for the safe and low-wear guidance of vehicles along a specified course in which the steering movements necessary to keep to the course are produced by drive and braking torques of the same magnitude but in opposite directions, which result in the steering moments necessary for steering. This method is used to actuate the drive wheels when the vehicle is traveling around curves.

DE 195 38 379 C1 describes a two-wheel truck with individual-wheel drive for track-guided vehicles with controlled steering, in which the truck for each wheel carrier has two vertical swivelling axes that are each located outside the wheel-rail contact points, whereby in alternation—with an arresting of the position of the swivelling axis that is currently outside the curve—the wheel carrier is pivoted around precisely this axis.

DE 41 35 691 A1 describes a method for the regulation of vehicles with individual-wheel drive and brake modules which, in addition to achieving optimum utilization of the adherence and preventing slip/stick effects, can act to assist guidance. In this case, each drive module has its own closed-loop torque control circuit, with an estimating element for the determination of the current value of the torque, whereby the closed-loop torque control circuits are coupled to each other by means of a plurality of minimum value stages to eliminate the lateral forces.

EP 0 511 949 B1 describes a method for the control of a truck without rigid axle connections, in which at least two of the track wheels opposite one another are driven individually by separately actuatable drive units, and in which, when the vehicle is traveling around a curve, the drive units of track wheels opposite each other are operated at different outputs, whereby above a minimum speed of 10 km/h, in particular when the vehicle is traveling straight ahead, the power output of the drive units of the track wheels opposite each other is periodically increased and decreased within defined bandwidths, whereby the change in the power output of the track wheels opposite each other is done in phase opposition.

EP 0 590 183 B1 describes a method to improve the running characteristics of a truck that is provided with a plurality of individual wheels on a railway vehicle, the traction motors of which are fed by wheel blocks by means of two control and regulation devices. The speeds of rotation of the wheels are used to determine two wheel block speeds of rotation, from which a current speed differential is formed and compared with a predetermined speed differential set point. As a function of this negative deviation, a control output is then generated which, by addition or subtraction of a control lever set point, forms a torque set point for the respective wheel block. The speed differential set point is determined exclusively for one wheel block as a function of a determined radius of curvature and of the truck speed.

SUMMARY OF THE INVENTION

The object of this invention is to create a vehicle and a method to coordinate the drive of rail-guided vehicles with individual-wheel drive on straight and curved tracks, in which it becomes possible to travel through curves with minimum wear and maximum safety, thereby requiring little effort and expense for construction, and to attain higher speeds in straight sections of track.

The invention teaches that in a straight section of track, a speed differential of opposite track wheels is determined, a control output is determined by a controller as a function of a set point, and the frequency and the damping of the control output can be dynamically adjusted by controller parameters. In the ideal case, the set point is thereby zero. The torque set points for the torque-controlled individual-wheel drive systems are calculated from the required acceleration moment and the control output.

When the vehicle is negotiating curves, the angular position of the axle that can be fixed in position with regard to the underbody is adjusted so that the track wheels are tangent to the rails by adjusting the angular position of the axle by means of the torque set points of the individual wheel drives. The torque set points for the torque-controlled individual-wheel drives are calculated from the required acceleration torque and the control output determined by the controller. The controller thereby determines the set point from the curvature of the rails and the control output from the angular position of the axle—which corresponds to the actual measured value.

The curvature is thereby measured continuously, so that if it drops below a threshold value, the axle can be arrested in position, to guarantee quieter running on the straight sections of track.

BRIEF DESCRIPTION OF THE DRAWINGS

The invention is described in greater detail below and is illustrated in the accompanying drawings, in which.

DESCRIPTION OF THE PREFERRED EMBODIMENTS

Figure 1:
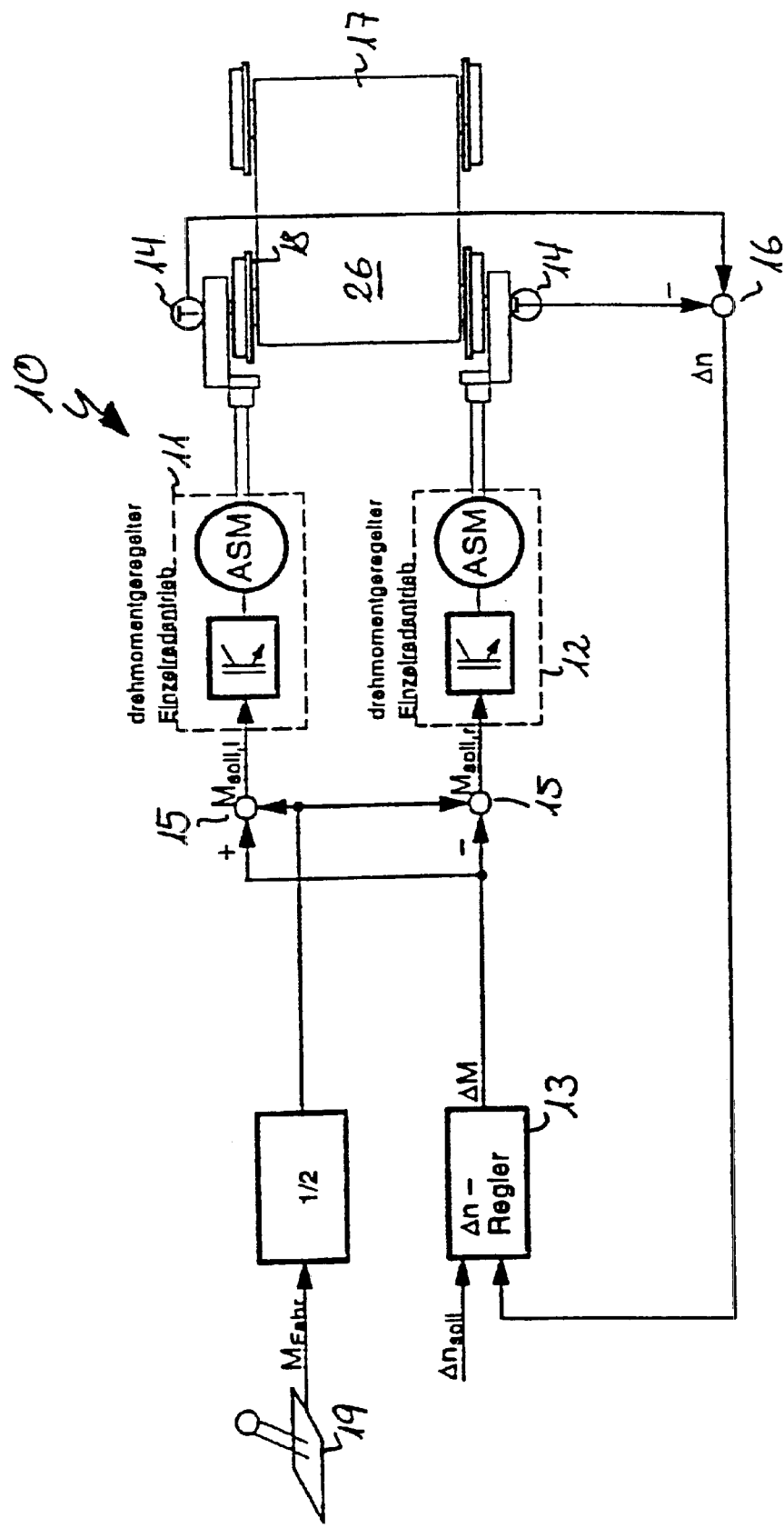
FIG. 1 is a schematic illustration of the controller for straight sections of track for a vehicle, the track wheels of which are connected with torque-controlled individual-wheel drive systems that are driven by a controller as a function of speed sensors and the torque specified from the control stand.

FIG. 1 shows a drive coordination control system for straight sections of track 10, which controls the torque-controlled individual-wheel drive systems 11 and 12 of a railway vehicle 26. The individual-wheel drive systems 11 and 12 are connected to track wheels 18 that are opposite each other. From the speeds of rotation of the track wheels 18 determined by speed sensors, a differential speed $\Delta n$ is calculated by a subtraction element 16. From the differential speed $\Delta n$, which equals the current measured speed, a controller 13 calculates a control output $\Delta M$ as a function of a set point. In the ideal case, the set point is zero, but in response to manufacturing tolerances of the individual wheel drive systems 11 and 12 and of the track wheels 18, it can be adapted to individual conditions as required. In an additional embodiment, the differential speed $\Delta n$ can be calculated from the speed of the engine.

The controller 13 is designed so that the frequency and the damping of the control output AM can be adjusted dynamically by controller parameters. For example, the controller parameters can be adapted as a function of the speed. The controller 13 thereby preferably has a proportional section and an integral section, to simulate the dynamic, sine-wave action of a truck with a wheel set axle. The controller 13 also comprises a differentiating part, the parameter settings of which can be used to adjust the damping of the centering action.

The torque set points $M_{Set,l}$ $M_{Set,r}$ for the torque-controlled individual wheel drives 11 and 12 are calculated from the acceleration torque $M_{Traction}$ requested by the driver and the control output $\Delta M$. In this case, the control output $\Delta M$ is added, with respectively different mathematical signs, by a summing element 15 to one-half of the required acceleration torque $M_{Traction}$. The acceleration torque $M_{Traction}$ can be set at the driver's control stand 19.

Figure 2:
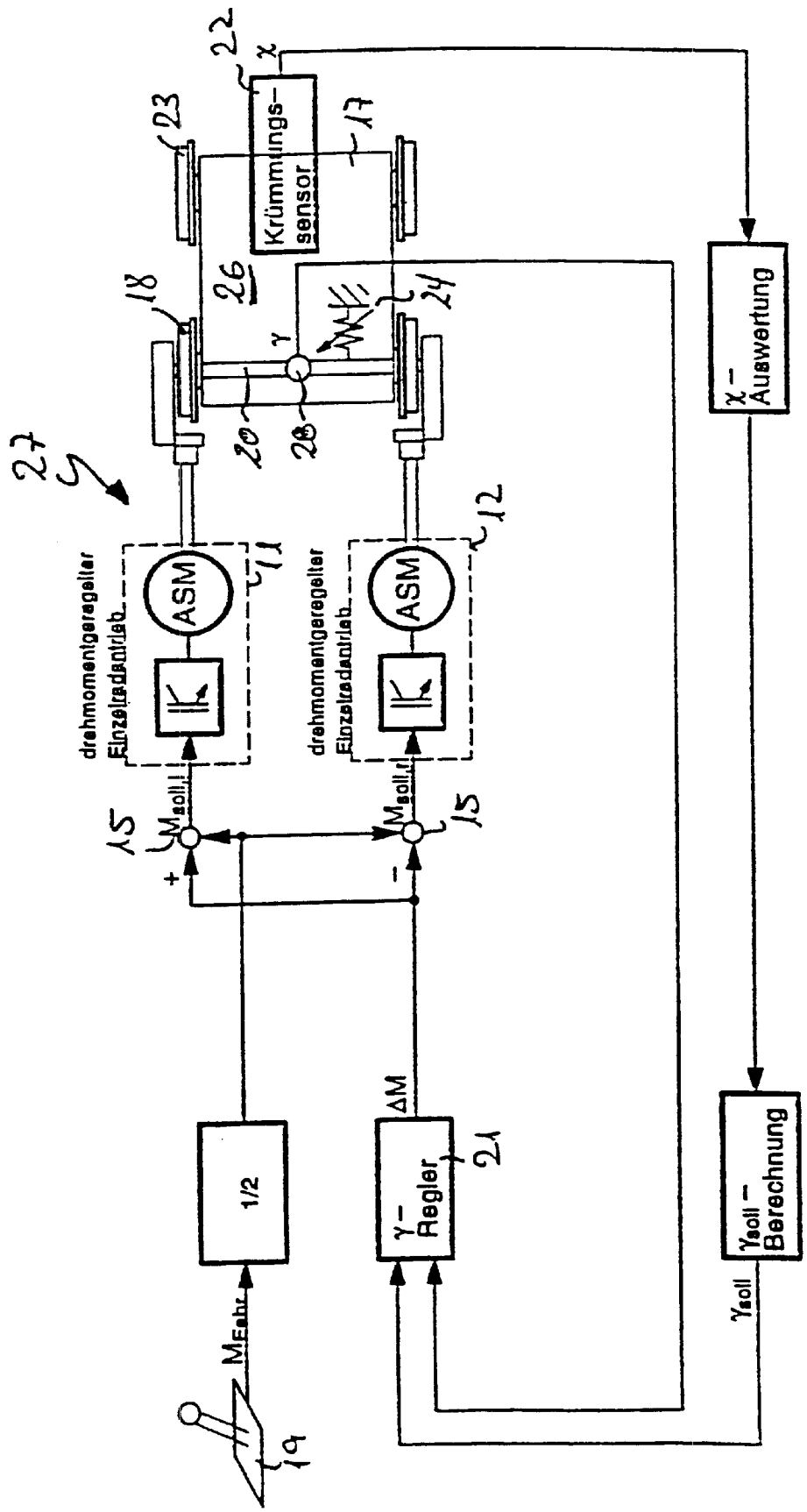
FIG. 2 is a schematic illustration of the controller for curved sections of track for a vehicle, the track wheels of which are connected with torque-controlled individual-wheel drive systems that are actuated by a controller as a function of the curvature and the angular position of the axle.
Figure 3:
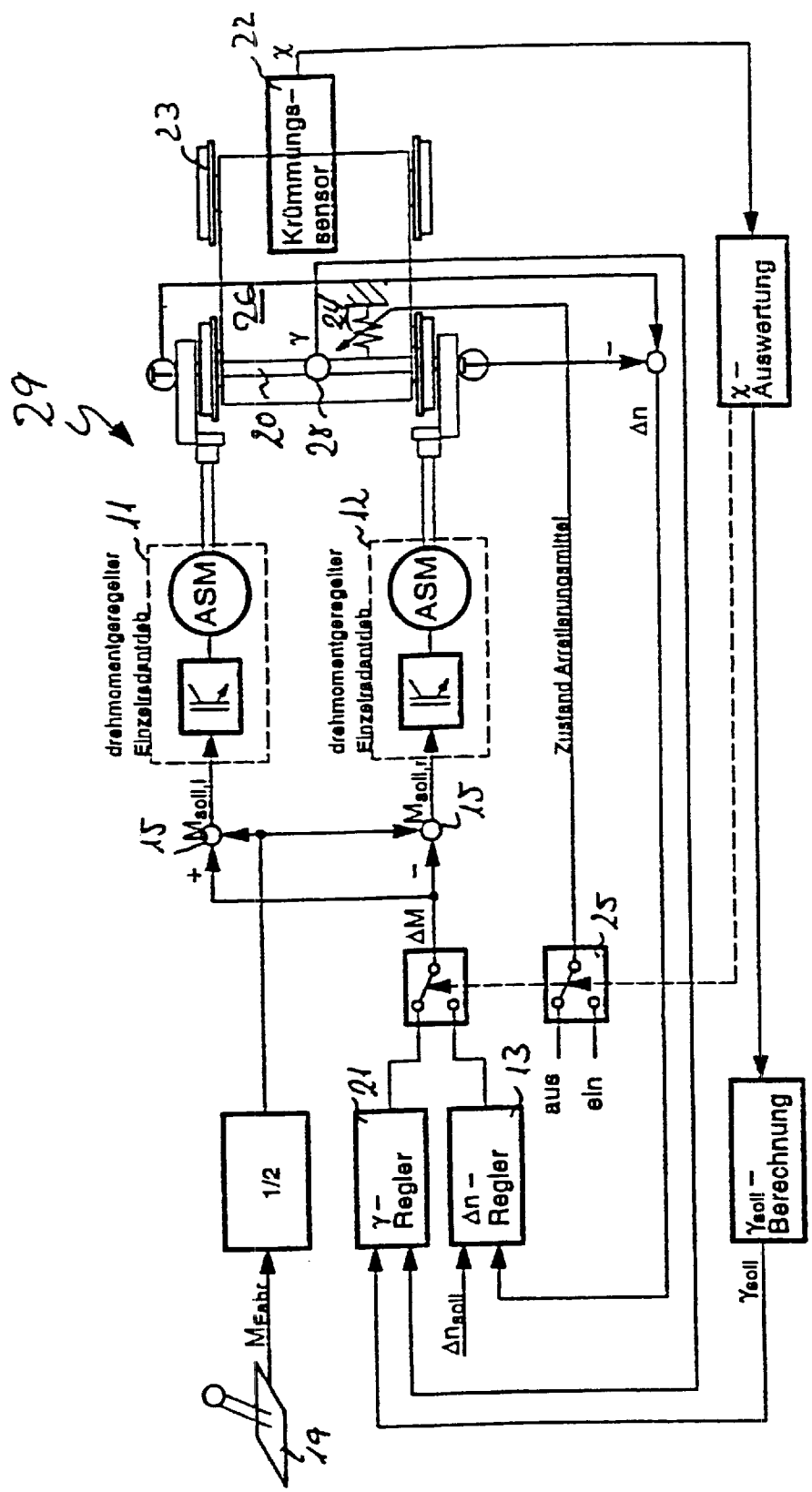
FIG. 3 is a combination of the control systems in FIG. 1 and FIG. 2, whereby arresting means fix the pivoting axle in position when the curvature is less than a specified value.

FIGS. 2 and 3 show an underbody 17 of the vehicle 26 with track wheels 18 which are fastened to a rotationally mounted axle 20, which preferably represents the rear axle. The axle 20 is preferably located on a central pivot 28 and can be returned to a specified position by restoring means 24. The front track wheels 23 are self-steering and are connected independently of each other with the underbody 17.

FIG. 2 shows a drive coordination control system 27 for curved sections of track, which is preferably based on the illustrated underbody 17. In this case, the angular position $\gamma_?$ of the axle 20 with respect to the underbody 17 is adjusted so that the track wheels are tangential to the rail. The angular position $\gamma_?$ of the axle 20 is set by means of the torque set points $M_{Set,l}$ $M_{Set,r}$ of the individual wheel drive systems 11 and 12.

The torque set points $M_{Set,l}$ $M_{Set,r}$ for the torque-controlled individual wheel drives 11 and 12 are calculated from one-half the acceleration torque $M_{Traction}$ input by the driver, and the control output $\Delta M$ determined by the controller 21. The control output $\Delta M$ is thereby determined by the controller 21 as a function of the curvature $\chi$ of the rail as the set point and the angular position $\gamma_?$ of the axle as the current measured value.

Depending on the direction of the curve, the control output $\Delta M$ is thereby added with a positive or negative mathematical sign to the acceleration torque $M_{Traction}$ input by the driver for the respective individual wheel drive 11 or 12, so that the sum of the two set points $\Delta M^*$ equals zero.

The curvature $\chi$ is calculated by dividing the angular velocity $\Omega$ by the translation velocity v. The sine-wave of the set point $\gamma_?$ of the controller 21 is calculated by multiplying the curvature $\chi$ by one-half the distance between the curve sensor 22 and the axle 20 to be steered. The approximation described here prevents the rear axle 20 from being steered, although only the forward axle is in the curve. Thus there are two approximations during the entry into the curve. The first implies that for an exact calculation of the set point at the curve entry, both the curvature on the forward axle and on the rear axle must be known, but on account of the rotation of the truck, only one value in between them is measured. The second is an approximation in the calculation of the steering angle during the curve entry. The two approximations essentially cancel each other out, so that the calculated set point $\gamma_?$ agrees very well with the ideal steering angle curve.

The translation velocity v is determined by known means. The angular velocity $\Omega$ is preferably calculated by a rotational or gyro sensor.

The curvature $\chi$ of the rail is determined by a curve sensor 22 at the wheel position of non-driven forward wheels 23, which are preferably mounted so that they can rotate individually and are self-steering.

The assumption that the axle is being correctly guided in the track channel is manifestly incorrect. Instead, the axle, as a result of the variations in the track, can execute back-and-forth motions that are excited by variations in the position of the rails. These disruptions are measured by the curve sensor 22 and result in erroneous calculations. To eliminate the effect of the back-and-forth movements of the axle, the measured value of the angular velocity $\Omega$ is smoothed by means of a low-pass filter (not shown).

FIG. 3 shows a combination 28 of the drive coordination control system on a straight section and the drive coordination control system on a curved section. The curvature $\chi$ of the track is thereby measured continuously, so that it if drops below a specified threshold, the axle 20 must be fixed in position by an arresting means 25. After the position of the axle has been arrested, the method described in FIG. 1 for straight tracks is activated. If the measured value exceeds the specified threshold, the arresting means 25 are released, and the method described in FIG. 2 is activated.

If the angular control system is defective, the axle 20 is returned to its original position by restoring means, so that it can be arrested in the neutral position.

The invention further comprises track-guided vehicles that have the drive coordination regulation system described above either for straight sections of track or for curved sections of track, or for both straight and curved sections of track.

Nomenclature 10 drive coordination control system for travel on straight tracks
11 torque-controlled individual wheel drive
12 torque controlled individual wheel drive
13 controller
14 speed sensor
15 summing element
16 subtraction element
17 underbody
18 track wheel
19 driver's control stand
20 axle
21 controller for curves
22 curve sensor
23 track wheel, front
24 restoring means
25 arresting means
26 vehicle
27 drive coordination control system for travel on curved tracks
28 pivot
29 drive coordinaton control system for travel on curved and straight tracks

What is claimed is:

1. A method to coordinate the drive of a rail-guided vehicle with individual-wheel drive on a straight section of track comprising the steps of:
 determining a differential speed ($\Delta n$) between opposite track wheels;
 determining a control value ($\Delta M$) by a controller as a function of a set point; and
 adjusting frequency and damping of the control value ($\Delta M$) dynamically by controller parameters.

2. The method as claimed in claim 1, wherein the set point is zero.

3. The method as claimed in claim 1, wherein torque set points ($M_{Set,l}$ $M_{Set,r}$) for torque-controlled individual wheel drive systems are calculated from required acceleration torque ($M_{Traction}$) and the control value ($\Delta M$).

4. The method as claimed in claim 3, wherein the torque set points ($M_{Set,l}$ $M_{Set,r}$) are calculated by addition of one-half the acceleration torque ($\frac{1}{2}$ $M_{Traction}$) and the control output ($\Delta M$).

5. The method as claimed in claim 4, wherein the control output ($\Delta M$) has a different mathematical sign, depending on a drive side.

6. The method as claimed in claim 1, wherein the controller has a proportional section and an integral section to simulate the dynamic sine-wave action of a truck with a wheel set shaft.

7. The method as claimed in claim 1, wherein the controller has a differentiating section, parameter settings of which can be used to adjust damping of a centering action.

8. The method as claimed in claim 1, wherein the controller parameters can be adapted as a function of speed.

9. The method as claimed in claim 1, wherein differential speed ($\Delta n$) is calculated from engine speed.

10. A method for a drive coordination of a rail-guided vehicle with individual-wheel drive, on a curved section of track, of at least one axle is fastened so that it can rotate with respect to an underbody, wherein angular position ($\gamma_{st}$) of an axle with respect to an underbody is adjusted so that track wheels are tangential to a rail, whereby angular position ($\gamma_{st}$) of the axle is set by means of torque set points ($M_L$, $M_R$) of individual wheel drives.

11. The method as claimed in claim 10, wherein the torque set points ($M_{Set,l}$ $M_{Set,r}$) for the torque-controlled individual wheel drives are calculated from a required acceleration torque ($M_{Traction}$) and a control value ($\Delta M$) determined by a controller, whereby the controller calculates the control value ($\Delta M$) from curvature ($\chi$) as a set point and an angular position ($\gamma_{st}$) of the axle as current measured value.

12. The method as claimed in claim 11, wherein the control value ($\Delta M$), depending on the direction of the curve, is added with a positive or a negative mathematical sign to the required acceleration torque ($M_{Traction}$), so that the sum of the control values ($\Delta M^*$) is zero.

13. The method as claimed in claim 10, wherein curvature ($\chi$) is calculated by dividing angular velocity ($\Omega$) by the translation velocity (v).

14. The method as claimed in claim 13, wherein to eliminate influence of back-and-forth movement of a truck, the measured value of the angular velocity ($\Omega$) is smoothed by means of a low-pass filter.

15. The method as claimed in claim 13, wherein the angular velocity ($\Omega$) is determined by a rotational or gyro sensor.

16. The method as claimed in claim 10, wherein the set point ($\gamma_{st}$) is determined by multiplying the curvature ($\chi$) by one-half the distance between a curve sensor and the axle to be steered.

17. The method as claimed in claim 10, wherein the curvature ($\chi$) is determined at a wheel position of non-driven front wheels that are mounted so that they can rotate individually.

18. A method to coordinate the drive of a rail-guided vehicle with individual-wheel drive with at least one axle that is fastened so that it can rotate with respect to the underbody, whereby the curvature ($\chi$) of the track is measured continuously, and when the measured value drops below a threshold, the axle is arrested, comprising the steps of:
 determining a differential speed ($\Delta n$) between opposite track wheels;
 determining a control value ($\Delta M$) by a controller as a function of a set point; and
 adjusting frequency and damping of the control value ($\Delta M$) dynamically by controller parameters,
and when a threshold is exceeded, on a curved section of track, of at least one axle is fastened so that it can rotate with respect to an underbody, wherein angular position ($\gamma_{st}$) of an axle with respect to an underbody is adjusted so that track wheels are tangential to a rail, whereby angular position ($\gamma_{st}$) of the axle is set by means of torque set points ($M_L$, $M_R$) of individual wheel drives.

19. The method as claimed in claim 18, wherein the event of an incorrect angular control setting, the axle is returned to the neutral position and arrested there by a device.

20. A rail-guided vehicle comprising:
 individual-wheel drives that are torque-controlled; and
 a controller which on a straight section of track regulates individual wheel drives by the method claimed in claim 1, whereby differential speed ($\Delta n$) can be determined by means of speed sensors.

21. A rail-guided vehicle comprising:
 individual wheel drives that are torque-controlled;
 at least one rotationally mounted axle on which the track wheels driven by individual-wheel drives are mounted so that they can rotate; and a controller which in a curve regulates individual-wheel drives according to the method claimed in claim 10, whereby the curvature ($\chi$) can be determined by a curve sensor.

22. A rail-guided vehicle comprising:

individual-wheel drives that are torque-controlled;

at least one rotationally mounted axle on which the track wheels driven by individual wheel drives are mounted so that they can rotate;

a controller which on a straight section of track regulates individual wheel drives by the method claimed in claim 18, whereby the differential speed ($\Delta n$) can be determined by means of speed sensors;

a controller which in a curve regulates the individual wheel drives according to the method claimed in claim 18, whereby the curvature ($\chi$) can be determined by a curve sensor; and arresting means to fix axle in position, which means are controlled by the method claimed in claim 18.

23. The rail-guided vehicle of claim 21, wherein the individual wheel drives which drive rear track wheels in the direction of travel, front wheels which are mounted so that they can be steered individually in the direction of travel and the curve sensor determine the steering angle of the front track wheels.

24. The rail-guided vehicle of claim 21, wherein restoring means center the axle.

* * * * *